Aug. 28, 1934. A. NELSON Re. 19,294

BRAKE SHOE

Original Filed Dec. 12, 1928

Inventor
Albert Nelson
By Wm. O. Belt atty.

Reissued Aug. 28, 1934 Re. 19,294

UNITED STATES PATENT OFFICE 19,294

BRAKE SHOE

Albert Nelson, Chicago, Ill., assignor to The American Brake Shoe & Foundry Company, Wilmington, Del., a corporation of Delaware Original No. 1,768,921, dated July 1, 1930, Serial No. 325,417, December 12, 1928. Application for reissue June 19, 1934, Serial No. 731,383

5 Claims. (Cl. 188—258)

This invention relates to brake shoes and it has for its object to reinforce and strengthen the shoe and to hold the parts of the body together in case of fracture.

A further object of the invention is to provide a novel reinforcing back which is embedded in the body of the shoe at the back thereof and which is shaped transversely to provide a truss effect for securing greater strength and better protecting the shoe against fracture.

In the accompanying drawing illustrating a selected embodiment of the invention, Fig. 1 is a top plan view showing one form of the reinforcing back in a shoe which is broken away and indicated in broken lines.

Figure 1:
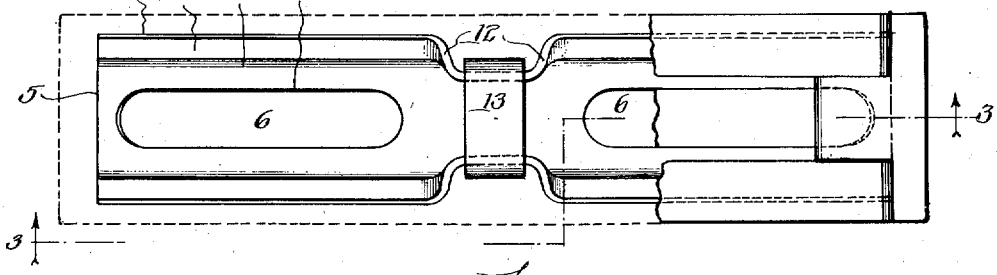
Figure 2:
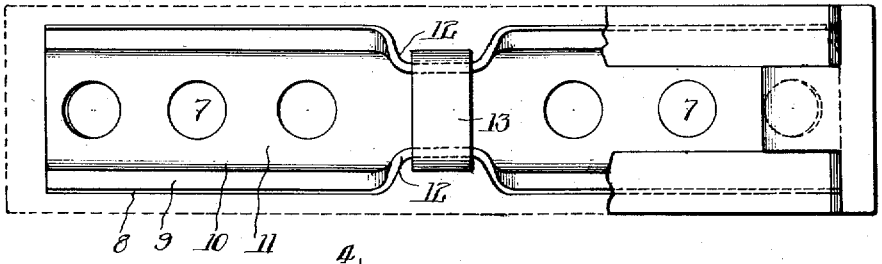
Fig. 2 is a similar view showing another form of the reinforcing back.
Figure 3:
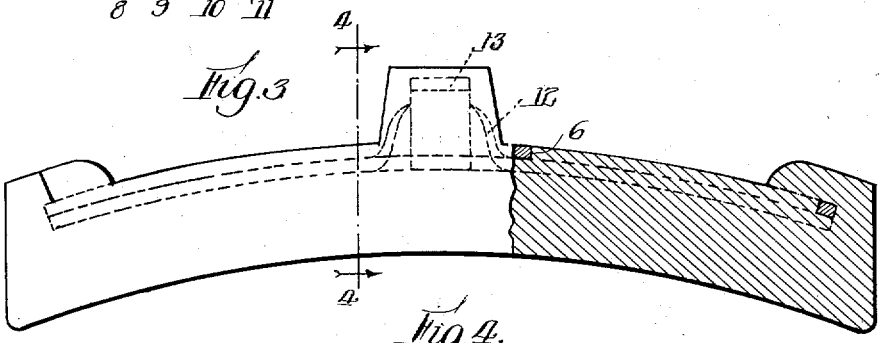
Fig. 3 is a side elevation of the shoe partly shown in section on the line 3—3 of Fig. 1.
Figure 4:
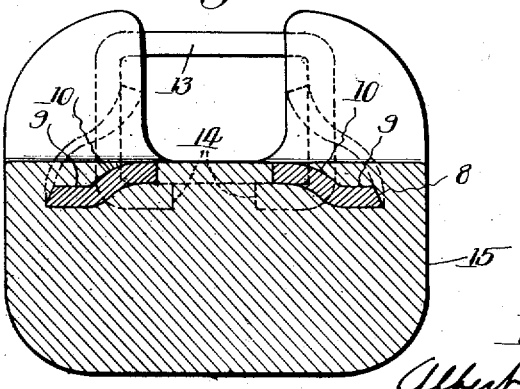
Fig. 4 is a transverse sectional view on the line 4—4 of Fig. 3.

I have shown the invention embodied in a simple form of solid cast iron car shoe but it will be readily understood that it may be embodied in other kinds of shoes, including composite shoes, without departing from the invention. The back 5 is formed from a single piece of sheet metal by bending and shaping a suitable blank and it is provided with elongated openings 6, Fig. 1, or with a plurality of circular openings 7, Fig. 2. The blank is provided with beveled side edges 8 and with flat side margins 9 which are connected by curved shoulders 10 with the flat crowned intermediate portion 11. The bottom of the crowned portion is in or about the plane with the top of the side margins, but the crowning effect may be varied in degree as found desirable. Midway between the ends of the back, in the embodiment illustrated, the side margins are bent upward at 12 to reduce the width of the back to accommodate the steel lug 13 which is engaged with the back by bending its ends 14 under the back. The body 15 is cast on the back in the usual manner and the back is embedded in the body, at the back thereof, with the crown exposed between the shoulders 10. The particular form of back forms a transverse truss which greatly strengthens the back and the shoe and, furthermore, the construction provides for an effective union of the back with the body which insures against separation. The back will also in an efficient manner hold the parts of the body together in case of fracture so that the shoe may be continued in service notwithstanding the fracture.

As before stated, the invention may be embodied in other types of shoe than the solid cast iron car shoe illustrated in the drawing and changes in the form, construction and arrangement of parts may be made in embodying the invention in other shoes, and for other purposes, within the scope of the following claims:

I claim:

1. A brake shoe back consisting of a single strip of metal having outwardly projecting side margins, a centrally disposed crowned portion extending the length of the strip, and shoulders connecting said side margins with the crowned portion.

2. A brake shoe back having flat side margins, a flat crowned central portion extending substantially the length of the strip, and curved shoulders connecting the side margins with the crowned portion.

3. A brake shoe comprising a back and a body cast thereon, the back consisting of a single metal strip having flat side margins, a flat crowned intermediate portion, and curved shoulders connecting the margins with the crowned portion, the body metal embedding the side margins and the shoulders and exposing the top of the crowned portion.

4. A brake shoe back having a central portion in one surface and side margins in another and parallel surface, said portion and margins extending to the ends of the back.

5. A brake shoe back having substantially flat margins, a longitudinally-extending flat crowned central portion and portions connecting said margins and central portion, the portions joining the adjacent edges of the central portion and margins being angularly disposed with relation to both of them.

ALBERT NELSON.